United States Patent [19]

Buchelt

[11] Patent Number: 4,796,836
[45] Date of Patent: Jan. 10, 1989

[54] LIFTING ENGINE FOR VTOL AIRCRAFTS

[75] Inventor: Benno Buchelt, Maria Saal, Austria

[73] Assignee: Dieter Schatzmayr, Klagenfurt, Austria

[21] Appl. No.: 10,360

[22] Filed: Feb. 3, 1987

Related U.S. Application Data

[63] Continuation-in-part of Ser. No. 834,799, Feb. 28, 1986, abandoned.

[30] Foreign Application Priority Data

Feb. 28, 1985 [AT] Austria .................................. 600/85

[51] Int. Cl.$^4$ ............................................. B64C 29/00
[52] U.S. Cl. .................................. 244/23 R; 244/23 C; 244/12.2; 416/223 R
[58] Field of Search .................. 244/12.2, 23 R, 23 H, 244/23 B, 23 C, 56, 66, 67, 62; 416/DIG. 2, DIG. 5, 223 R, 223 A

[56] References Cited

U.S. PATENT DOCUMENTS

| | | | |
|---|---|---|---|
| 2,468,787 | 5/1949 | Sharpe | 244/12.2 |
| 3,034,747 | 5/1962 | Lent | 244/23 C |
| 3,127,093 | 3/1964 | Sudrow | 244/23 C |
| 3,181,811 | 5/1965 | Maksim, Jr. | 244/12.2 |
| 3,489,374 | 1/1970 | Morcom | 244/12.2 |
| 3,614,030 | 10/1971 | Moller | 244/23 C |
| 3,630,470 | 12/1971 | Elliot | 244/23 C |
| 3,785,592 | 1/1974 | Kerruish | 244/23 C |
| 4,411,598 | 10/1983 | Okada | 416/DIG. 2 |
| 4,564,337 | 1/1986 | Zimmer et al. | 416/DIG. 2 |
| 4,569,631 | 2/1986 | Gray, III | 416/DIG. 2 |

FOREIGN PATENT DOCUMENTS

| | | | |
|---|---|---|---|
| 1227779 | 10/1966 | Fed. Rep. of Germany . | |
| 1957009 | 5/1971 | Fed. Rep. of Germany | 244/12.2 |
| 673444 | 11/1969 | Italy | 244/12.4 |
| 516487 | 9/1939 | United Kingdom | 416/DIG. 2 |
| 1600994 | 10/1981 | United Kingdom | 416/223 R |

Primary Examiner—Galen Barefoot
Assistant Examiner—L. M. Fiorito
Attorney, Agent, or Firm—Herbert Dubno

[57] ABSTRACT

A hovering or VTOL aircraft with a propulsion unit using a fan in a shroud whose upper end is toroidally shaped and rotationally symmetrical with a convex curvature with a radius of curvature between 0.2 $r_f$ and 1 $r_f$ from a location 1.4 $r_f$ upstream of the blade plane to a location 0.2 $r_f$ downstream thereof. The blade, whose tip radius is $r_f$ has a twist at least from a range of ±0.25 $r_f$ around a mean radius between hub and tip to the tip such that the airflow velocity through the meridian increases outwardly from the hub of the fan toward the periphery of the fan.

15 Claims, 5 Drawing Sheets

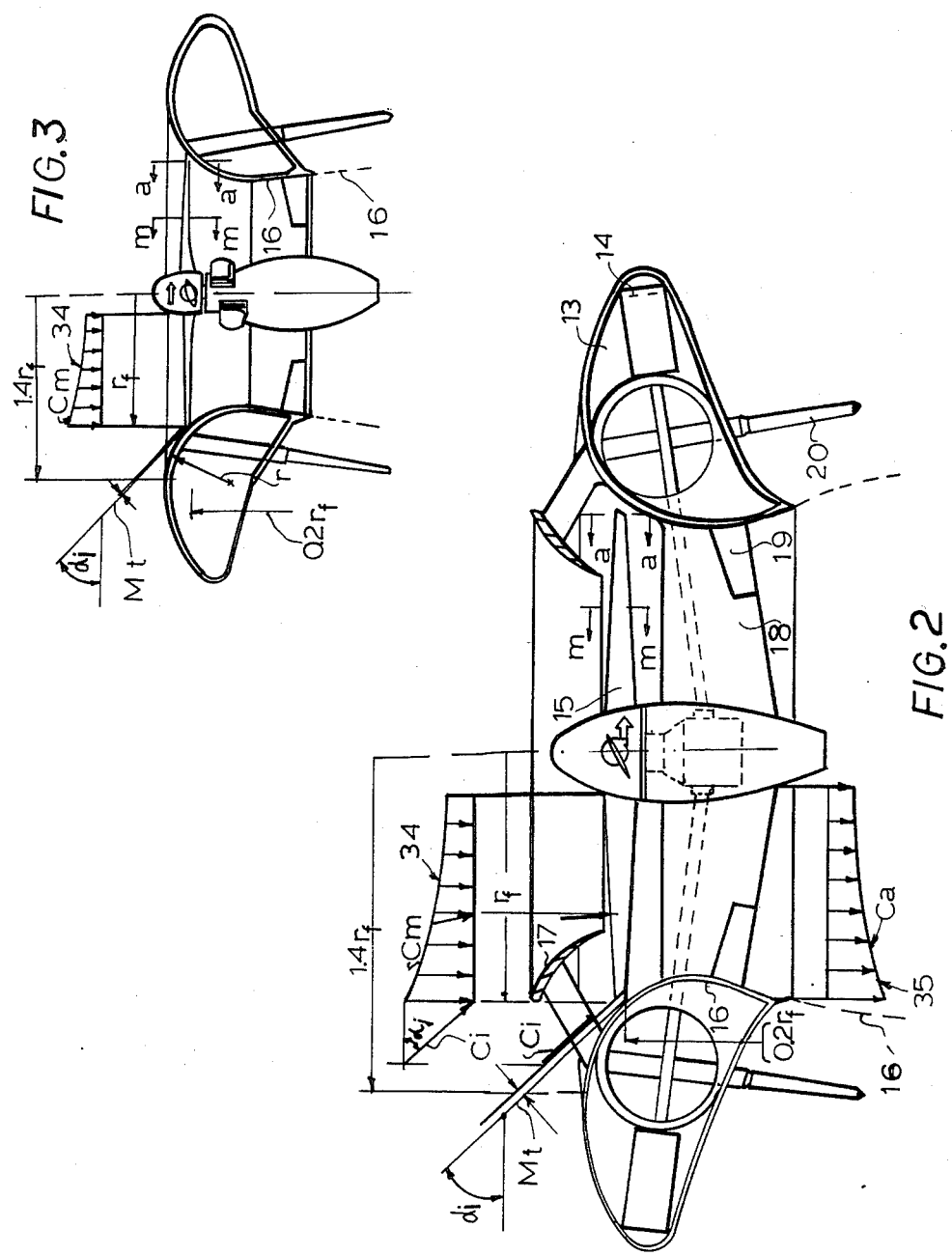

LIFTING ENGINE FOR VTOL AIRCRAFTS

CROSS REFERENCE TO RELATED APPLICATION

This application is a continuation-in-part of Ser. No. 834,799, filed Feb. 28, 1986, now abandoned but replaced by a continuation application Ser. No. 107,892 filed Oct. 9, 1987.

FIELD OF THE INVENTION

My present invention relates to an engine for vertical take-off lift aircraft and, more particularly, to an improvement in engine fan blade and fan inlet shroud assemblies for operation with such engines.

BACKGROUND OF THE INVENTION

In the jet engine literature there is a chain of misleading conclusions in the representation of the force balance for the hovering flight of lift engines such as helicopter rotors and jet engines at static thrust conditions on test rigs. Engineering knowledge is an accumulation of approximations and one has to be aware of the degree of allowable approximations. I am concerned here only with errors which can reduce the thrust predictions in the range of 20% (test rig measurements of jet engines) and in the range of 100% (cylindrically shrouded lift fans, as applied to some known VTOL prototypes of the 1960's).

Because of these errors in vertical takeoff and landing (VTOL) aircraft theory, mistakes have been made in the design of the aircraft which, in part, I am able to remedy with the present invention. Before explaining the invention, however, it is important to develop both the errors in existing theory and the contribution of the prior art to the development of engine fan and fan shroud assemblies.

The failures in the force balance of hovering lift engines and static thrust definitions include five points A through D:

A. An excessively simplified propeller theory, from Froude and Rankine for the case of vertical hovering with free (unshrouded) propellers.

When the momentum laws are applied, the control area at the propeller entrance is treated as being moved to infinity in order to be able to say that "the control area inlet velocity is approaching zero value and hence the inlet momentum is also approaching zero value."

This is an oversimplified statement. One can never move the control area to infinity and forget the underpressure forces on it at the same time, if one applies the momentum laws for a force balance on a subject (jet engine) inside the control area. Misleading conclusions can occur already even when the control area is treated as being at a generous distance from the subject of the examination, as illustrated under point B below. Theoretically, one can draw the control area at any distance including infinity around the considered subject. One will gain different force components for each control area definition. But the resultant inlet force must always be the same, if no major component is "forgotten". It must be also the same resultant force in infinity.

The state-of-the-art propeller theory has overlooked the inlet momentum in front of the propeller and in front of jet engines in the hovering condition and the thrust supporting underpressure force at the same place which compensates partially the inlet momentum force. This compensation would be theoretically exactly an ½ part of the inlet momentum force, if the stream line would flow in parallel through a cylindrical inlet duct of a jet engine and if the inlet force balance is made on a closely to the inlet drawn control surface. The remaining effective half of the braking inlet momentum force is the resultant inlet force, acting along the jet engine axis. If one moves the control surface of any shape to infinity upstream of the jet engine inlet, including any inlet stream line picture, this resulting inlet force can never disappear, when moved along it's acting line in contrast to faulty static thrust theory in the present state of the art literature. Faulty static thrust theory takes regard only to the diminishing inlet momentum force, when the control surface is moved to infinity. Faulty theory overlooks that the diminishing inlet momentum force component is only replaced by an additional underpressure force component rising on the backside projection of the growing control surface balloon, when the border transition to infinity is made. This backside is defined in a view from infinity towards the engine inlet seen along the engine axis. Underpressure forces have determined values also on a big control surface in infinity, because the diminishing underpressure is compensated by the increasing surface area of the control surface. The basic law of mechanics, that a force cannot disappear when moved along its acting line supplies the border condition for the integral "pressure difference times area vector element" which hence is not undetermined. Furthermore overlooks faulty VTOL and static thrust theory the counterdependence between the momentum forces and underpressure forces between the adjacent stream surfaces (which appear as stream lines in two dimensional pictures) given by the Energy Law Equation (Bernoulli) and the Continuity Law Equation.

Furthermore existing analysis techniques have overlooked the centrifugal force caused by the curved stream lines acting on the control surface. The only force taken into consideration in the state-of-the-art propeller theory for the static thrust case is the exit momentum force $\dot{m}\, c_a = F$ downstream of the propeller, where the jet is contracted to a cylindrical shape.

The jet energy is roughly $\dot{m}\, c_a^2/2$ or the supplied engine power is $1/\eta\, \dot{m}\, c_a^2/2 = p$. Hence, according to standard propeller theory the ratio Lift-/Power$=F/P=\eta(2/c_a)$. This is wrong.

I have reported a corrected theory derived with a control surface closely drawn to the propeller and without omitting essential forces, which shows that $$F/P = \eta(1.7/c_a)$$

instead of $$F/P = \eta(2/c_a)$$

for free helicopter rotors. The factor "1.7" represents the influence of geometry. Using this value, modern helicopter rotors have a more believable calculated efficiency of approximately 0.75 instead of 0.55 calculated by the old unmodified theory.

B. The factor "2" in $F/P = \eta 2/c_a$ which actually is already questionable for helicopter rotors, as noted in point A, is transferred to all other lift configurations in the criticized VTOL-theory.

For example, this factor has been applied to cylindrically shrouded fans which were the lift engines for a number of well known VTOL-projects in the 1960's.

Actually the factor "2" must be replaced by other numbers or coefficients for each different lift engine geometry, derived theoretically from a control surface for the application of momentum laws as close as possible to that of the engine under consideration.

Cylindrically shrouded fans should have an idealized geometry factor of "1" instead of "2", as I have shown in my paper *"Comparison of Lift Concepts"*, which means a 100% difference and half of the expected lift force at a given engine power compared to the questionable state of the art theory. This significant mistake is found in papers of authors employed at companies who made VTOL aircrafts with cylindrically shrouded fans.

C. Another defect in the standard theory is the neglect of the considerable inlet forces, resulting in an not permissible excessively simplified thrust equation for jet engines:

$$T = \dot{m}(c_a - c_o)$$

where
- $\dot{m}c_a$ = Exit momentum force
- $\dot{m}c_o$ = Inlet momentum force
- T = Thrust during forward flight
- $\dot{m}$ = Mass flow rate per second
- $c_a$ = Nozzle exit velocity
- $c_o$ = Flight velocity, sometimes designated as c.

Even if one agrees to neglect engine nacelle forces, the mass increment at the exit due to added fuel (an error of 1 to 3%), and if one assumes the presence of a cylindrical exit jet (no static pressure thrust) there is still a 15 to 20% error in this equation. The latter error stems from the neglect of centrifugal forces acting on the curved stream lines in front of the engine if one moves the control surface as so far foward, that $\dot{m} c_o$ is the inlet momentum. The suction velocity of the jet engine usually is only 0.6 times the value of the flight velocity which is close to the sound barrier. Hence, there results a conical expansion of the suction jet causing the centrifugal forces.

The thrust equation $T = \dot{m}(c_a - c_o)$, which is used also in many papers of the jet engine industry, is actually valid only for the case where the flight velocity $c_o$ is equal to jet engine entrance velocity, that is at about 300 mph at usual layouts of jet engines.

The validity of this equation cannot be expanded to flight velocities of 980 km/h by means of a simple forward move of the entrance control surface to a place where the velocity of the suction jet is equal to $c_o$, because one cannot neglect other forces, caused by this forward move.

D. Chief among the improper conclusions arising from the excessive simplified thrust equation $T = \dot{m}(c_a - c_o)$ is that the prior static thrust value can be derived from this equation.

The literature often states that "Flight velocity $c_o$ is equal to zero at static thrust condition therefore $T = \dot{m} c_a$". $T = \dot{m} c_a$ is called "gross thrust" (Brutto-Schub). In actuality this is not the static thrust of a jet engine as it beings take-off on a runway. Still to be considered must be the inlet velocity at static thrust condition dictated by the air foil geometry of the compressor and the compressor speed. This inlet velocity imparts a braking inlet momentum and an underpressure thrust supporting force compensating the inlet momentum only to approximately half of its value where the jet engine inlet duct is approximately cylindrical.

E. The view that $T = \dot{m}c_a$ fully represents the "generated force" of a lift engine in hovering condition and the static thrust of a jet engine has several bases as mentioned under point D. Prior art proof of these views rest upon jet engine evaluations in test rigs. However, it is here pointed out that the jet engine test rigs were not fitted with nacelles as in real aircraft. Test rig engines have an inlet fairing (bell mouth, inlet shield) and therefore the force balance on a test rig is very different from that of an engine mounted in an aircraft nacelle. Actually the axial component of the underpressure force acting on the inlet fairing has to be added to the exit momentum thrust $\dot{m}c_a$ instead of being considered as a part of $\dot{m}c_a$.

This incorrect belief is widespread in the art. It is seen in the literature through the photographs of engines on their test rigs. There are plenty of wirings for measurements on all places, but none on the inlet fairing which is rigidly attached to the jet engine. Evidently the art believes that the suction force on the inlet fairing is part of $\dot{m}c_a$ and therefore it is not necessary to determine it separately. Fortunately this force acting on the inlet shield can be added to the exit momentum thrust $\dot{m}c_a$. Theoretically one can derive this with a force balance based on a control surface for the application of momentum laws closely approaching the engine surface, considering the inlet fairing as part of the engine.

Beside small losses due to curved inlet flow, one can obtain this underpressure force on the inlet shield without additional engine power beside the power $\dot{m} c_a^2/2$, which is the concomittant for the exit thrust $\dot{m}c_a$. Theoretically one can prove this basic concept of the radial and tangential force balance acting on the curved inlet stream lines, being aware that the underpressure generating centrifugal force is normal to the stream line tangent and hence causes no force component in the tangential direction. Thus it does not influence the power need for the acceleration of fluid particles from zero velocity to $c_a$. This basic concept is missing in the literature apart from my contributions noted earlier.

Two other forces act upon the inlet area of testing engines. There is the inlet momentum $\dot{m}c_1$ acting across the first stage compressor entrance area as a braking force, which amounts approximately to twice the positive thrust supporting underpressure force acting on the inlet fairing. This inlet momentum force is reduced again to half of its effective value by means of the underpressure force over the first stage compressor area which is in accord with the Bernoulli equation $$A_r \rho \frac{c_1^2}{2} = \frac{A_r \rho c_1}{m} \frac{c_1}{2} = \dot{m} \frac{c_1}{2}$$

where $\rho$ air density and $A_r$ = the compressor first stage entrance area.

The remaining half of the braking inlet momentum force is by accident approximately compensated by the inlet fairing suction force as I have theoretically derived in various papers. This compensation corresponds to the accidental dimensions of the inlet as used on test rigs. Hence three forces approximately compensate one another at the test engine air entrance on the test rig, i.e. the inlet momentum force is approximately compensated by one half through means of the underpressure force in front of the first stage compressor rotor and by the other half through means of the inlet fairing underpressure. The only force acting on the test rig with cylindrical exhaust jet appears to be the exit momentum thrust $\dot{m} c_a$. Therefrom arise the misleading concepts discussions under points B and D above which are stated in terms of "test rig experience."

Under varying geometric configurations, as in the drawing of the present disclosure, the forces at the engine entrance will also vary and do therefore *not* compensate each other and *must* therefore be taken into account.

I have suggested that F/P be defined as $F/P = \eta f_G(1/c_a)$ where $f_G$ is the "Geometry Factor'"—the influence of geometry, $1/c_a$ is the influence of exit velocity niveau level and $\eta$ is the overall efficiency. This replaces the erroneous correlation $F/P = (2/c_a)$, where the number "2" is even not correct for hovering propellers but is mistakingly applied to any lift engine which accelerates air downwards. Actually this number has to change at different geometries. This number, $f_G$, the "Geometry Factor" can reach the value of "3" at FIG. 3 and can increase up to "6" at FIG. 1. But it is never a constant exclusively of the value "2".

With cylindrically shrouded lift fans the geometry factor $f_G$ reaches the value "1" instead of the erroneous value "2" as it appears in papers of companies who have built such cylindrically shrouded fans based on the wrong theory of these papers. The moderate performance has been explained as a matter of efficiencies.

DESCRIPTION OF SPECIFIC PRIOR ART (PRIOR ART STATEMENT)

Because there are a variety of similar configurations in the field of VTOL vehicles, but with different background basis and hence geometric differences, I discuss below a number of references to the extent that they are similar to or different from this invention as described in the brief description below and, of course, in Ser. No. 834,799.

A. U.S. Pat. No. 3,034,747

There is no statement about this radial velocity distribution along a fan blade and no indication of any twist of the fan blades. There are also no statements about the meridional shape of the propeller shroud, which changes throughout in all FIGS. Fan blade twist and corresponding relations of the meridional geometry, however, are a principal subject of Ser. No. 834,799.

In some figures of U.S. Pat. No. 3,034,747 there is no rotational symmetry of fan inlet duct, whereas in Ser. No. 834,799 rotational symmetry shows up in all FIGS.

In some FIGS. of U.S. Pat. No. 3,034,747 the fan shroud contour is cylindrical, whereas the fan shroud contour in Ser. No. 834,799 never is cylindrical.

In FIGS. 16 and 25 of U.S. Pat. No. 3,034,747 the most narrow diameter of the flow path lies below the multistage compressor obviously because of the decrease specific volume of the air passing through the compressor stages, where hence the tip diameters decrease from stage to stage as is known in the state of the art of multi stage axial compressors. In the Ser. No. 834,799 in FIGS. 2 and 3 the most narrow diameter of the fan flowpath lies below the fan in combination with a single stage fan.

FIGS. 11, 13, 17 and 6 of U.S. Pat. No. 3,034,747 show a multitude of fan ducts in the VTOL aircraft, where the inlet fairing surface between adjacent fan ducts cannot produce an effective underpressure. Ser. No. 834,799 never suggests a multitude of fan ducts close to each other.

B. U.S. Pat. No. 3,261,162

This patent represents the application of what is known as the "Coanda Effect" to rotational symmetry and contains no means to influence the velocity distribution over the annular curved circular wing. There is no statement in this patent about this velocity distribution, which is a principal concern of Ser. No. 834,799. There is no fan, no statement about the blading of such a fan and no statement about the meridional curvature of the shroud, of such a fan. The geometry of U.S. Pat. No. 3,261,162 is very different being similar only with respect to annular curved wing which is not the subject of Ser. No. 834,799

C. U.S. Pat. No. 3,614,030

This patent discribes an accumulation of features which are not present in Ser. No. 834,799, because they would destroy and disturb the streamline picture whose creation is the purpose of the geometry described in Ser. No. 834,799:

The differences include:

$C_1$. There is no rotational symmetry of the inlet duct, which is considered as a necessity in Ser. No. 834,799.

$C_2$. There are straight lined, non annular parallel inlet guide vane cascades in U.S. Pat. No. 3,614,030 which also prevent the rotational symmetry of inlet flow.

$C_3$. There is a cylindrical fan shroud duct. In Ser. No. 834,799 there is neither shown nor recommended a cylindrical fan duct, because such would not be consistent with the particular twist of fan blades as described in Ser. No. 834,799.

$C_4$. There is no disclosure about the twist of fan blades in U.S. Pat. No. 3,614,030.

$C_5$. There is no disclosure as to the curvature proportions of the fan shroud, which is a major concern in application Ser. No. 834,799.

$C_6$. There is no disclosure as to any particular velocity distribution over the fan radius which, again, is a major concern of Ser. No. 834,799.

$C_7$. As in U.S. Pat. No. 3,261,162 there is a multitude of fan ducts arranged in a VTOL lift body, close to one another thus disturbing the surface underpressure lift effect in body surface zones between adjacent fan ducts due to mass forces caused by Z-shaped stream lines.

D. U.S. Pat. No. 3,489,374

There is no statement in this patent about the chord angles of the fan blades in this patent or as to any specific velocity distribution over the fan radius, which is a main concern in Ser. No. 834,799.

The plurality of inlet shields is such that they are located one above another with coinciding outside diameters. This results into a totally different force balance in contrast to arrangement of Ser. No. 834,799, where a plurality of inlet shields can be staggered in a manner that, seen from top, the inner shield always overlaps only an inner portion of the next outer shield causing a very different streamline picture and force balance as compared with that of U.S. Pat. No. 3,489,374.

The geometry features of U.S. Pat. No. 3,489, 374 will have a very moderated lift effect, because forces between the annular double wings compensate each other in the external force balance. Hence there is no reason to combine such a geometry with a fan according to Ser. No. 834,799.

E. Italian Pat. No. 673,444

This patent shows a retractable inlet duct but with cylindrical shape, representing a forward elongation of the cylindrical fan duct and no curved annular inlet shields as shown in Ser. No. 834,799 which cover completely the entrance area, when retracted.

Furthermore the system of Italian Pat. No. 673,444 has a cylindrical duct portion around the fan, which is not the case in Ser. No. 834,799 and which would be contrary to the particular twist of the fan of Ser. No. 834,799. Ital. Pat. No. 673,444 does not disclose anything about the radial velocity distribution of the fan and the corresponding twist of fan blades, which again is a principal concern of Ser. No. 834,799.

F. German Federal Republic Open application No. Germany 1 957 009

This patent document shows double and triple annular wing arrangements which are similar to those of U.S. Pat. No. 3,489,374. There is no central axial fan in German patent document No. 1 957 009 as is required in Ser. No. 834,799. Instead there is an unusual radial compressor arranged on large diameters at the periphery of said double and triple annular wings, which create poor efficiency and structural design problems. Ser. No. 834,799 is, therefore remote from any similarity to such a geometry.

G. French Pat. No. 1,186,372

There is no statement in text, figures and claims of French Pat. No. 1 186 372 as to how to influence the streamline pattern and hence there is no statement about the geometry of the meridional fan duct or about the twist of fan blades which again are principal concerns of Ser. No. 834,799. In Ser. No. 834,799 a cylindrical duct around the fan is not suggested and would not match the theoretical flow path requirements of the particular twisted fan.

OBJECTS OF THE INVENTION

The principal object of my invention is to advance the principles set forth in my prior application Ser. No. 834,799 of Feb. 28, 1986.

Another object of my invention is to take advantage of my corrected theory and apply this discovery to improving the static thrust of aircraft engines.

It is also an object of my invention to provide improvements in contrast to merely cylindrically shrouded fan lift engines as in the state of the art.

A further object of my invention is to provide a new type of vertical lift engine with improved fan blades and inlet shroud configurations allowing improvements in thrust generation.

Yet a further object of this invention is to provide an improved engine system and aircraft which obviates drawbacks of the art.

SUMMARY OF THE INVENTION

These objects and others which will become apparent hereinafter are attained, in accordance with the invention in an aircraft as described in Ser. No. 834,799 which is hereby incorporated in its entirety and in which the propulsion apparatus for vertical aerial lift, usable as independent vehicle or integrated in an aircraft nacelle as lift engine, comprises a single stage fan with preferably vertical axis, which moves air downwards. The fan shroud at the fan entrance is formed by a torus like part having rotational symmetry around the fan axis at least with a minimum radius of 1.4 times a fan tip radius, forming a tip gap around the fan of less than 1/25 of the fan diameter.

According to the invention, the Lift Force/Engine Power ratio is improved by the following combination of features:

I. The fan has fan blades with cross sectional aerfoils at the tip radius which have an angle between an aerfoil chord line and the circumferential direction of rotation increasing with an additional amount ranging from zero to 25 degrees compared with chord line angles of cross sectional aerofoils at a mean fan blade radius which is defined as the arithmetic mean between fan tip radius and fan hub radius;

II. A distribution of curvature radii of the continuously convex fan inlet shroud ranging from a region seen radially located at 1.4 times fan tip radius upstream of the fan to a station located 0.2 times fan tip radius downstream of the fan, seen axially where the meridional curvature radii have a value of 0.2-times up to 1.0-times fan tip radius. Where the fan tip radius is represented as $r_f$, the meridional radii of curvature of the torus-like convexly curved part have a value of $0.2r_f$ to $1.0r_f$ from a location substantially $1.4r_f$ upstream of the fan to a location substantially $0.2r_f$ downstream of the blades.

III. The meridional curvature of the fan shroud continuously passes through the plane of the fan blade axis downstream and blend in smoothly into a diffusor when a single stage fan is used.

According to a feature of the invention a multiple sequence of annular inlet shields with rotational symmetry are provided around the fan axis, where the inner airfoil of such an annulus always overlaps the inner ring portion of the adjacent next annulus of greater diameter, seen from top. The inlet shield with most large diameter overlaps the inner ring portion of the fan shroud which forms the main disk.

Advantageously when there are only two inlet shield or no shields there is an angle between the tangent of the meridional shroud and a horizontal plane, at an axial station at which the plane of the axis of the fan blades is located. This angle will be 30 to 70 degrees, so that the most narrow diameter of the outer fan meridian is located downstream of the axis plane of the fan blades thus providing the full amount of air inlet velocity for the generation of the underpressure lift on top of the main disc surface, but having only the vertical component of these air inlet velocity for generating a minimum of lift reducing inlet momentum force.

A lift engine integrated in an aircraft nacelle can have the inlet shields retractable in the direction of the fan axis toward the fan blade plane. The inlet shields can cover completely the fan inlet duct in a closed condition, as seen from top.

A diffusor can be provided downstream of the single stage fan which has an annular sharp trailing edge at the flow exit, the annular trailing edge being retractable in axial direction of the fan.

A lift engine with a multistage axial compressor can also have the aforedescribed inlet geometry. The radial twist of the fan runner blades of the first compressor stage have the increasing chord angle of the airfoils with an increment ranging from zero to 25 degrees as stated for the single stage fan and where this particular twist of the first stage runner blades progressively changes through all following stages. The last stage can have airfoil chord lines, which gradually decline toward the circumferential direction of rotation from hub to tip.

The flow exit downstream of the multistage fan can be formed by means of a flow accelerating nozzle.

BRIEF DESCRIPTION OF THE DRAWING

The above and other objects, features and advantages of my present invention will become more readily apparent from the following description, reference being made to the accompanying highly diagrammatic drawing, in which:

FIG. 2 shows a cross section of a VTOL aircraft exhibiting a single inlet shield, representing a typical configuration with a small number of inlet shields;

FIG. 3 shows a cross section of a VTOL aircraft exhibiting having no inlet shield;

Specific Description

Figure 1:
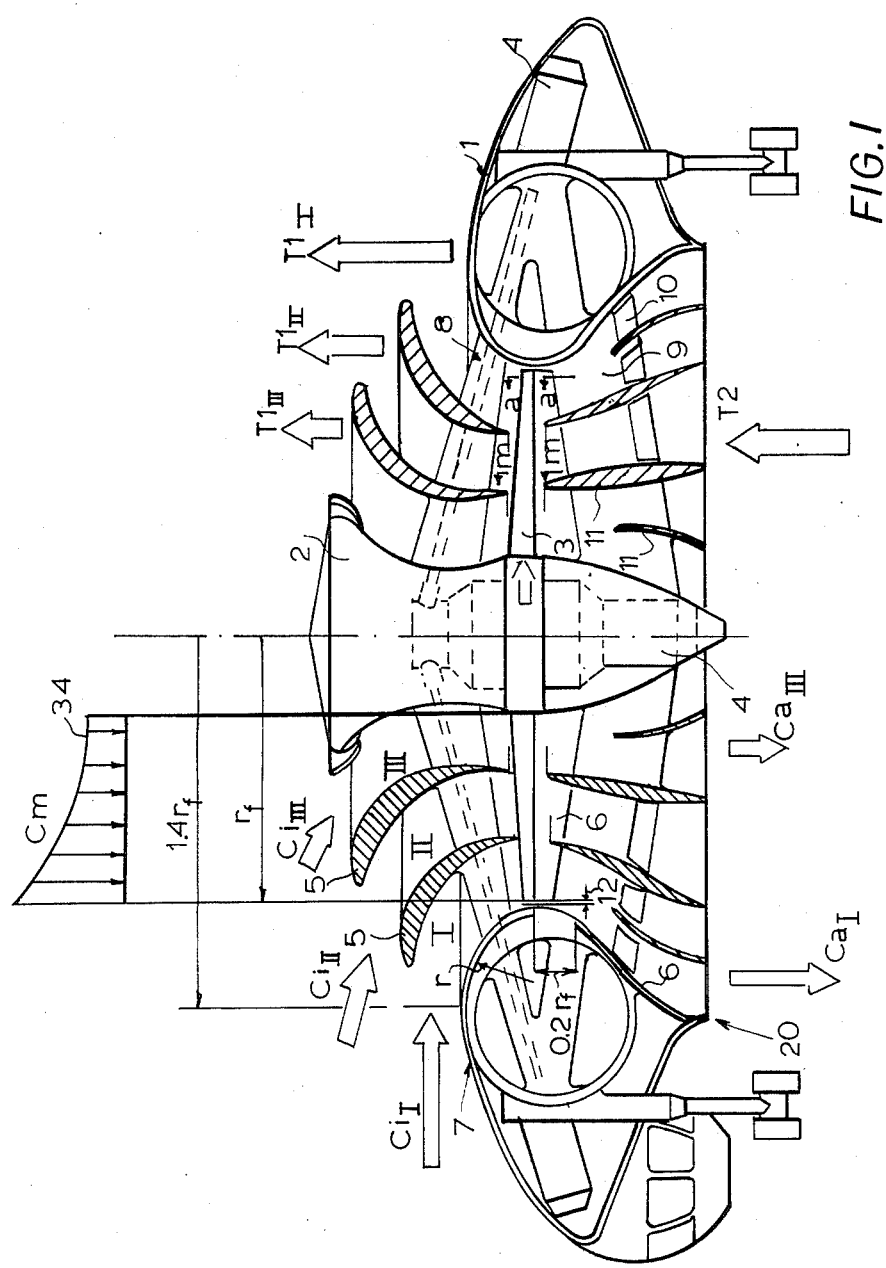
FIG. 1 shows a cross section of a VTOL aircraft taken through the engine and fan shroud.

FIGS. 1 through 6 represent the physical improvements to VTOL engines arising from correction of misperceptions of force balances long held in the art regarding hovering lift engines. Maximization of the Lift/Power (F/P) ratio may be achieved by inlet shroud geometrics represented in the Figures. FIG. 1 shows a mechanical structure capable of achieving maximum thrust. FIG. 3 shows a configuration which is effective with a minimum structural effort. Despite that it still has a high F/P ratio being achievable.

The inlet fairing underpressure force, which can be generated with nearly no additional power consumption added to the generation of the jet exit power $\dot{m} c_a^2/2$ should be as large as possible. Therefore, means are presented which promote radial horizontal inflow. These means are in praticular twisted fan blades which are presented in FIGS. 1–6 and staggered inlet shields shown in FIGS. 1, 4 and 5.

The exit momentum force $\dot{m} c_a$ which requires engine power $(1/\eta \dot{m}(c_a^2/2)$, is reduced to a smaller amount by means of installing a diffuser downstream of the fan, thus increasing the F/P ratio to a maximum. The diffuser size is only limited by weight considerations. Increased weight is reducing the Lift/Weight ratio and too much diffuser expansion is causing flow separation problems. Use of a diffusor is suggested only where there is a strongly curved inlet fairing with an ample amount of underpressure lift on top of its surface. This force is a second lift force besides the exit momentum force $\dot{m} c_a$. Where one neglects the inlet momentum in hovering flight condition as it happens in faulty VTOL-theory, it can happen, that a diffusor downstream of a lift fan is combined with a merely cylindrical inlet duct to the fan. In such a situation, a diffusor causes breakdown of the thrust.

Where a correct force balance is applied based on a closely drawn to the object clearly defined control surface, one can clearly see advantages and disadvantages rising from a diffuser downstream of the fan.

Figure 5:
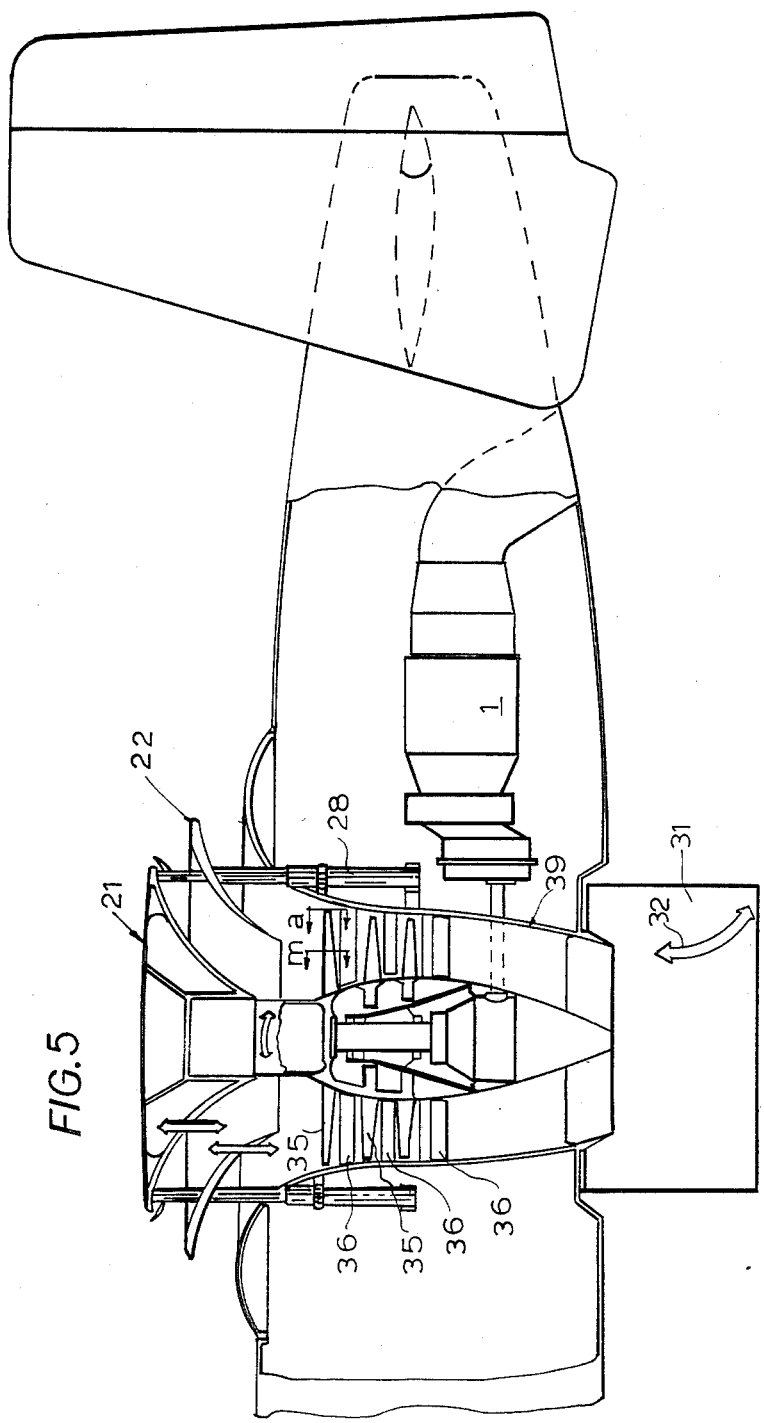
FIG. 5 shows a cross section of a VTOL aircraft of similar configuration to that of FIG. 4 but additionally illustrating a multi-stage fan.

With multistage axial compressors, as in FIG. 5, high area load (thrust/exit area) are obtainable by utilizing an exit nozzle instead of a diffusor to convert the pressure energy completely into kinetic energy. In this case (FIG. 5) the inlet lift force is only a small fraction of the exit momentum force $\dot{m} c_a$, because there will be a velocity $c_a$ in the range of, say, 400 m/s.

Figure 4:
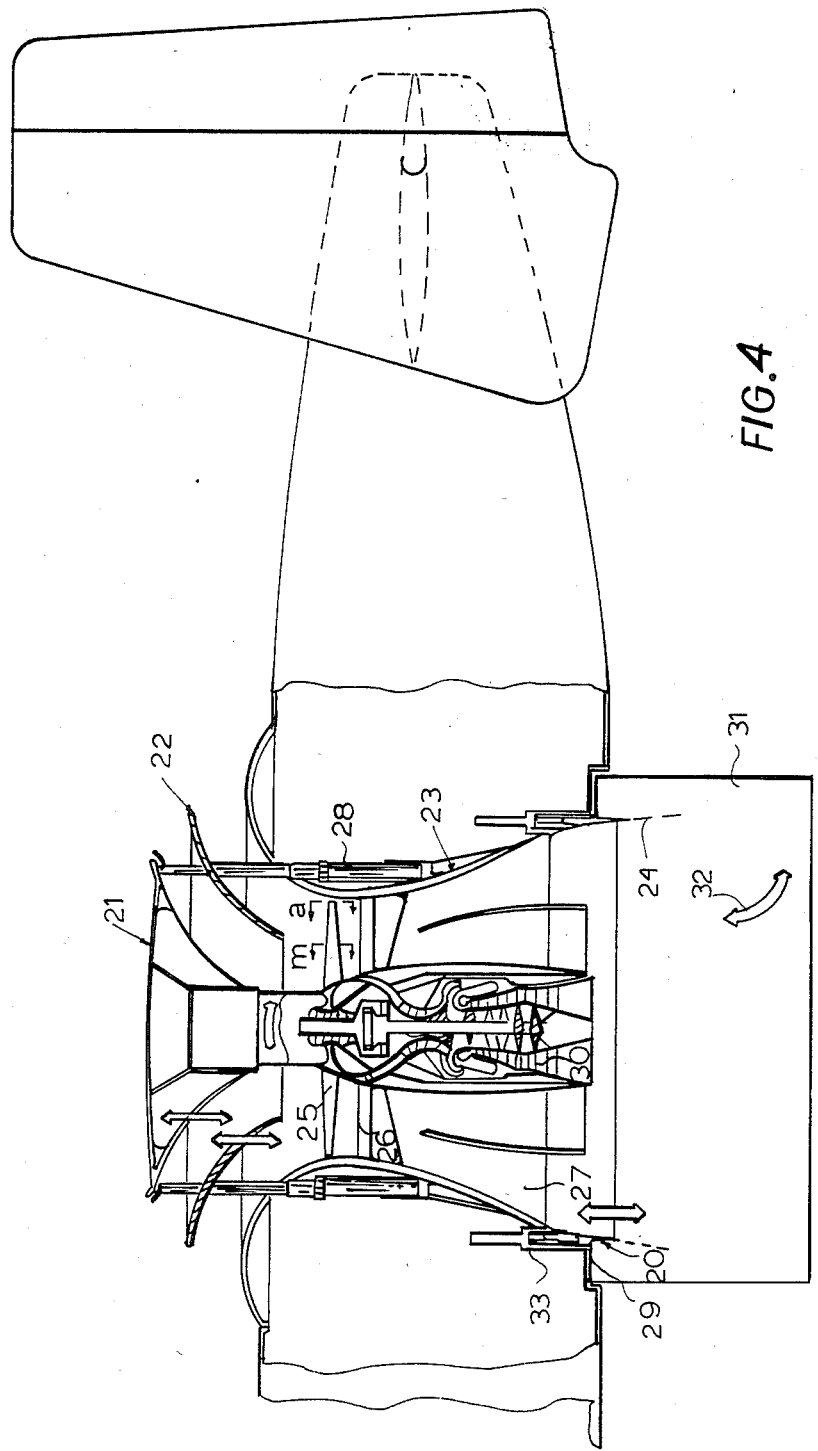
FIG. 4 shows a cross section of a VTOL aircraft illustrating a twisted fan embodiment.

With a single stage fan lift engine according to FIG. 4, a F/P ratio of 4 daN/kW may be reached which is equivalent to that of helicopters with big rotors. A disk load in the exit area amounting to 1000 daN/m² (1 daN=10N) is also reached indicating high fuel economy at comparatively high "disk loads'. An aircraft with a lift engine of the aforesaid power can hover for long periods.

The best combination for achieving both a high F/P value and high disk load referred to the minimum disk diameter is represented with FIG. 1: There are F/P values around 10 daN/KW and a disk load up to 300 daN/m² at the same time.

That means two times better values concerning F/P as compared with heavy lift helicopters and this at much smaller diameters, because the disk load is 5 to 7 times more high than helicopters show. The moderated structural effort configuration according to FIG. 3 will have the potential to realize still a value of F/P ranging from 6 to 8 at a disk load in the range of 40 to 50 daN/m².

Beside the potential of having high fuel economy due to high ratios of F/P at small diameters compared with helicopters, lift engines according to the invention have incomparible properties of its own:

They have a good positional flight stability for reasons not treated herein even without the aid of an automatic control.

Furthermore they are not sensitive to side touches with walls during hovering flight.

Lift disks are also not exposed to vibrations like helicopters, because of their carefully ducted stream-line pattern.

Applications as close to the object remotely piloted vehicle, video observations close to ground with small sized lift disks and flying cranes at large sizes, preferably remotely controlled, are a few of their numerous applications.

The control of the position during flight is effected in FIGS. 1 through 3 by means of full adjustable fan rotor blades rotatable around the blade axis as is known from state-of-the-art helicopters.

When only one lift engine according to FIGS. 4 and 5 is integrated in an aircraft nacelle, this type of control can be used also on lift engines according to FIGS. 4 and 5.

The fan driving engine can be a gas turbine or a piston engine at small configurations (FIG. 3). The arrangement of the driving engines can be either coaxial with the fan inside the hub (gas turbine 30 in FIG. 4, dotted line alternative 4 in FIG. 1) or as a diametral twin package or more than two engines inside the main disk body, connected by transmission shafts and bevel gear to the central fan (solid line at 4 in FIG. 1, engines 14 in FIG. 2, and the drive arrangement in FIG. 5).

FIG. 1 shows a maximum effort in mechanical structure in order to achieve a maximum ratio "Total lift-/Engine Power"—F/P at realistic efficiencies. The underpressure lift forces $T_{1I}$, $T_{1II}$, and $T_{1III}$ as designated in FIG. 1 can be at maximum as a result of the configuration of FIG. 1, whereas the exit momentum thrust $T_2$ in FIG. 1 is kept at a moderated value by means of a diffuser 6 downstream of the fan 3 ending with sharp trailing edge 20.

Figure 6:
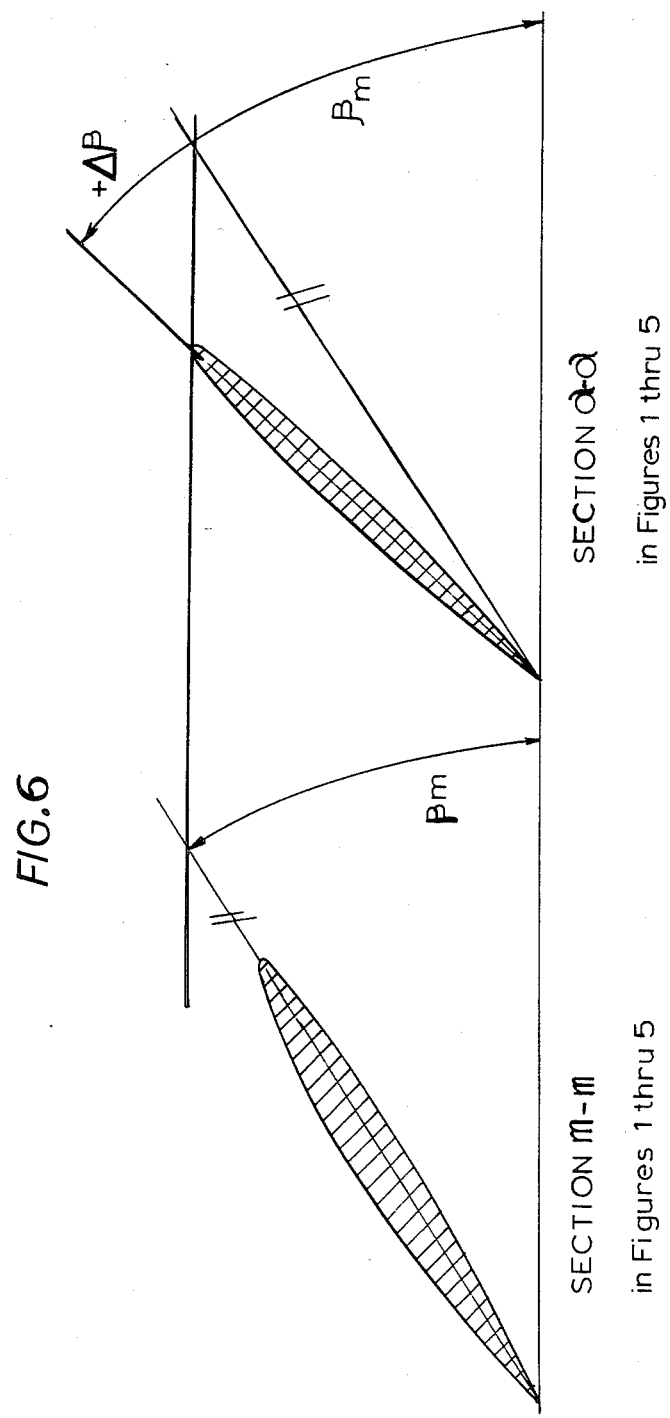
FIG. 6 is a diagram comparing typical blade cross sections along lines a—a and m—m of FIGS. 1 through 5.

The blade profiles are represented by the sections m—m and a—a in FIG. 1, shown in the comparison of FIG. 6. According to this diagram the angle between the airfoil chord line against the circumferential direction of rotation $\beta m$ in FIG. 6, defined on a mean blade radius between the tip and hub, increases in radial direction for an increment $+\Delta\beta$ in FIG. 6 (FIG. 6 is applicable to the blades of all FIGS. 1 through 5) in the range from zero to 25 degrees from a mean radius to the tip radius.

At the hub of the fan, the angle $\beta$ of the profile chord angle is more steep too, than compared with the angle on a mean radius as is usual in the art of merely cylindrically shrouded fans. These known fans have a profile chord angle against the circumferential direction, which decreases from hub to mean radius to tip radius steadily.

In the present disclosure this angle decreases only from hub to a range around mean radius (section m—m in FIGS. 1 through 5) but then it increases again from the mean radius to the tip radius or it stays at a constant value from mean radius to tip radius. This fan blade geometry can also be described as much less twisted by comparison with a fan for a merely cylindrically shrouded fan as known in forward flight fan gas turbines.

This particular twist of the fan blades should support the creation of a meridional velocity profile 34 in FIG. 1 ($c_m$- distribution) together with the tendency of the strongly curved inlet shroud 7 and the strongly curved inlet shields 5 in FIG. 1 to cause such a velocity distribution. The latter mentioned effect is also indicated in FIG. 1 by means of the different length arrows $Ci_I$, $Ci_{II}$ and $Ci_{III}$ representing the desired distribution of inlet velocities into the channels I, II and III in FIG. 1. The number of channels is not critical, important is the velocity distribution. At the xit there continues the nonuniform velocity distribution, Symbolized by the different length arrows $C_{aI}$ and $C_{aIII}$ in FIG. 1, the velocity increasing from a region proximal to the center to the outer periphery of the airflow passageway. The successive inlet shields 5 inwardly of the main disk 1 have successively smaller diameters.

The energy per kg mass flow transferred from the fan to the air will be approximately proportional to the squared $c_m$-profile 34 in FIG. 2 which is valid also for FIG. 1 (see the equivalent $C_i$ arrows), considered over the radius. For example if $c_m$ differs 3 times from hub to tip, the specific energy would differ 9 times from hub to tip at low pressure ratios of the fan.

In the state of the art of merely cylindrically shrouded fans there is an approximately constant transfer of specific energy over the radius applied, that means a 9 times difference to the mentioned example of a fan, which is a principal subject of this disclosure. The force equilibrium on fluid particles passing a fan of the type of this disclosure is only possible in combination with a strongly curved flowpath. The radius "r" of the surface 7 of the main disk 1 of the invention in FIG. 1 will have values within the range $r=rr_f$ and $r=0.2r_f$ present in a place ranging from $1.4r_f$ (see dimension lines in FIG. 1 through 3) towards the fan until an axial distance of $0.2r_f$ downstream of the fan, where $r_f$ is the tip radius.

The meridional curvature has to pass the plane of fan blade axis in the case of a single stage fan and can never be a cylindrical shroud before and after the fan. The fan will have a gap 12 against the tip shroud of less than 1/25 of the fan diameter.

Support struts 8 and 9 of airfoil cross section connect the main disk 1 with the hub 2, and serve also as torque compensating guide vanes of the fan. Rudders 10 control the position around the vertical axis.

FIG. 2 shows the same type of fan as described under FIG. 1 with typical blade sections m—m on a mean radius between hub and tip and a—a on the tip radius, as typically shown in detail in FIG. 6, causing a distribution of the meridional velocity $c_m$ over the radius, shown as item No. 34 in FIG. 2, which profile stays consistent through the diffuser and appears as outlet velocity distribution $c_a$, item No. 35 in FIG. 2.

The essential statemnt of FIG. 2 is the angle $\alpha_i$ of the fan shroud tangent (meridional tangent $M_t$) included with the blade plane, which will vary between 30 and 70 degrees.

This feature will be applied, if there are less than two inlet shields (17 in FIG. 2) and in the case that there is no inlet shield (FIG. 3).

The purpose of the angle $\alpha_i$ is to create a high value of tangential inlet velocity $C_i$ (see FIG. 2) in order to create a high underpressure $\rho(C_i^2/2$ on top of the surface of the main disk 13, but having a moderated amount of meridional velocity component $C_m$ parallel to the fan center line at the same time, because the $c_m$-components parallel to the fan axis are responsible for the braking inlet momentum force, which is only partially compensated by means of the underpressure across the fan entrance area (see FIG. 2).

Returning to FIG. 1 for a comparison one can say that the inlet shields of FIG. 1 have the effect of bending off the inlet momentum force, so that it is not necessary there to place the fan at an axial station where there is the most narrow diameter of the flowpath as it happens in FIG. 2 and FIG. 3.

Concerning the curvature of the fan shroud, there are the same criteria applied within the range $1.4r_f$ seen radially and $0.2r_f$ downstream of the fan seen axially as described as to FIG. 1.

Struts 18 support the main disk 13 with the hub. Two or more engines 14 drive the central fan over transmission shafts and bevel gears. In small lift disks, a single engine can be installed inside the hub. The struts 18 serve also as torque compensating guide vanes. Rudder 19 control the rotational position around the vertical axis, other positions are controlled by means of full adjustable fan blades as in the state of the art of helicopter rotors.

The system of FIG. 3 is generally the same as that of FIG. 2. The purpose or FIG. 3 is to show a configuration with no inlet shields, where the negative effect of the braking inlet momentum force is kept down by means of the fan shroud tangent angle $\alpha_i$ and the lift generating underpressure on radii larger than $r_f$ is kept as large as possible by means of this angle $\alpha_i$. There is the same explanation for it as under FIG. 2.

This simple structure can be used with small size lift disks, but can be applied also to large sized lift disks.

FIG. 4 shows the application of the particularly twisted fan and its inherent meridional shroud as a lift engine integrated in an aircraft nacelle. The bending off of the inlet momentum force to a horizontal direction (horizontal diametral force components compensate each other) is done by means of inlet shields 21 and 22 which can be retractable with multistage telescope arrangements 28 in FIG. 4 and FIG. 5. Those telescope arrangements can be based on a ball thread principle or can use hydraulic or pneumatic principles. After the end of the vertical take off and hovering flight, shields 21 and 22 in FIGS. 4 and 5 are retracted when the lift engine is shut off and other engines for horizontal propulsion take over to power the aircraft. The closed top surface ensures low drag during horizontal flight without extra parts, as the closing covers known in combination with known state-of-the art lift engines.

The lift engine of FIG. 4 has two lift force components. One is the suction force on top of the strongly curved surface 40 in FIG. 4 (41 in FIG. 5) which can be gained with nearly no engine power and which never is a part of the so called "gross thrust", identical with the exit momentum force, as erroneously taught in the art. This has been explained on the foregoing pages. The other force component is the exit momentum force for which engine power has to be delivered. Engine power is needed also for vorticity losses in the curved inlet duct and in the diffuser. In order to moderate the power demand for the exit momentum force, the diffuser is provided downstream of the fan. Such a lift engine can achieve a specific fuel consumption approximately ten times lower than straight through flow lift engines in the range of 0.1 lb fuel/lb thrust / hour 0.1 daN/daN/h) at a disk load of 1000 to 12000 daN/m² (10,000 to 12,000 Pa). The sharp trailing edge 20 is retractable, a bottom cover device 31 might close with a kinematic motion 32 the exit after shut off of the engine. The annular ring 29 which forms the trailings edge 20 is retractable into the annular space 33 by means of an analog device as the inlet shields are being retractable. The diffusion effect might not be finished at the hardware end of the diffuser, there is also an invisible diffuser effect 24 which takes into account the performance of the lift engine. Analogous invisible diffusers are represented at 16 in FIGS. 2 and 3. The diffuser must not be coaxial to the fan axis, as shown in FIG. 4. It might be split into several separated channels and ducted to favorable exit places in the aircraft. The term "diffusor" is valid for any type of channel with increasing cross section in the flow direction.

The gas turbine can be inside the hub propelling the low pressure single stage fan over a gear as illustrated in FIG. 4 or the single stage fan can be propelled from one or several engines outside the flowpath as illustrated in FIG. 5 by transmission shafts and bevel gearing.

The particular twist of fan blades characterized in section m—m on a mean radius between hub and tip and in section a—a on the tip radius detailed in FIG. 6 is of the same character for the same purposes as described to FIG. 1. The statements as to the meridional curvature dealing with FIG. 1 apply here also.

FIG. 5 shows a combination of a typical inlet according to FIG. 4 with a multistage fan of the axial compressor type.

The first stage compressor blades will have the particular twist previously described, where the angle of the chord line ($\beta$ in FIG. 6) increases from a radial midsection of the blade towards the tip, where $\Delta\beta$ in FIG. 6 is the chord angle increment, ranging from 0 degree to 25 degrees.

The very last stage of the multistage axial compressor will have a radial $\alpha$-distribution according to state of the art-layout which might be either the known method "free vortex blading" with $c_m$=constant over the radius or which might be the known method "degree of reaction=constant over the radius". In both cases, the angle $\beta$ (FIG. 6) decreases continuously from hub to tip at the blades of the very last stage in heavy contrast to the radial increase of $\beta$ at the innovative first stage from a radial midsection of the blades of the first stage to the tip.

The stages between first stage and last stage of the multistage compressor will have a smooth transition layout, changing the twist of compressor blades from the innovative mode of the first stage gradually through all stages to the state of the art twist in the last stage.

Because of the desired high pressure ratio by means of the application of a multistage compressor, there results a high exit velocity up to 450 m/s, which requires according to continuity laws a flow-accelerating nozzle 39 in FIG. 5 in contrast to the diffuser arrangements downstream of single stage fans in FIGS. 1 through 4.

I claim:

1. A propulsion apparatus for generating vertical lift in an aircraft, comprising:
    a fan shroud defining a substantially vertical airflow passage having an axis, an upper inlet end and a lower outlet end, said passage being rotationally symmetrical about said axis but differing from a right-circular cylinder over its entire length;
    a fan rotatable in said passage about said axis and having a plurality of generally radial blades where the radial axis of these blades is lying in a plane perpendicular to said axis between said inlet and outlet ends and where these fan blades can be also rotatable around their blade axis for control purposes;
    a torus-like convexly curved part rotationally symmetrical about said axis and formed on said shroud at said inlet end of said passage, said torus-like convexly curved part extending from a location substantially 1.4 $r_f$ upstream of said blades seen radially to a location substantially 0.2 $r_f$ downstream of said blades seen axially where $r_f$ is a tip radius of said blades measured from said axis to a tip of the blades, said tips of said blades defining a gap with said part which is at most 1/25 of the diameter of said fan; and
    at least one engine operatively connected with said fan for rotating same,
        said rotating blades being of airfoil cross section with the angle between the chord lines of the blades and the rotation plane of the fan blades decreasing from the hub of the fan to a radial midsection of the fan blades and increasing from the radial midsection towards the fan tip by an increment (AB) having a value in the range from 0 degrees up to 25 degrees to generate upon rotation of said fan a meridional airflow velocity through said passage which is nonuniform over the radius thereof and increases from a value proximal to said axis to a maximum at the periphery of said passage, said radial midsection of the fan blades being defined as a distance $\pm 0.25 r_f$ around a means fan blade radius and as the arithmetic means between fan hub radius and fan tip radius, and
        the meridional radii of curvature of said torus-like convexly curved part between said locations being $0.2 r_f$ to $1 r_f$.

2. The propulsion apparatus defined in claim 1 wherein said fan is a single-stage fan, said shroud being formed as a diffuser downstream of said torus-like convexly curved part, said torus-like convexly curved part merging smoothly into said diffuser.

3. A propulsion apparatus for generating vertical lift in an aircraft, comprising:

a fan shroud defining a substantially vertical airflow passage having an axis, an upper inlet end and a lower outlet end, said passage being rotationally symmetrical about said axis but differing from a right-circular cylinder over its entire length;

a fan rotatable in said passage about said axis and having a plurality of generally radial blades where the radial axis of these blades is lying in a plane perpendicular to said axis between said inlet and outlet ends and where these fan blades can be also rotatable around their blade axis for control purposes;

a torus-like convexly curved part rotationally symmetrical about said axis and formed on said shroud at said inlet end of said passage, said torus-like convexly curved part extending from a location substantially 1.4 $r_f$ upstream of said blades seen radially to a location substantially 0.2 $r_f$ downstream of said blades seen axially where $r_f$ is a tip radius of said blades measured from said axis to a tip of the blades, said tips of said blades defining a gap with said part which is at most 1/25 of the diameter of said fan;

at least one engine operatively connected with said fan for rotating same, said rotating blades being of airfoil cross section with the angle between the chord lines of the blades and the rotation plane of the fan blades decreasing from the hub of the fan to a radial midsection of the fan blades and increasing from the radial midsection towards the fan tip by an increment (AB) having a value in the range from 0 degrees up to 25 degrees to generate upon rotation of said fan a meridional airflow velocity through said passage which is nonuniform over the radius thereof and increases from a value proximal to said axis to a maximum at the periphery of said passage, said radial midsection of the fan blades being defined as a distance $\pm 0.25 r_f$ around a means fan blade radius and as the arithmetic means between fan hub radius and fan tip radius, and the meridional radii of curvature of said torus-like convexly curved part between said locations being $0.2 r_f$ to $1 r_f$, and a plurality of annular inlet shields with rotational symmetry about said axis positioned above said inlet end, each of said shields being of airfoil cross section and successive ones of said shields inwardly of said torus-like convexly curved part being of successively smaller diameters, each inlet shield of a smaller diameter always overlapping an inner ring portion of the inlet shield with the next larger diameter and the inlet shield of the largest diameter overlapping said torus-like convexly curved part, whereby said shields completely cover a major portion or completely said inlet end of said passage as seen from the above.

4. The propulsion apparatus defined in claim 1 wherein a maximal number of two airfoil-shaped rotationally symmetrical inlet shields is provided above said inlet end and partly overlaps said torus-like convexly curved part and has a concave surface juxtaposed therewith, and wherein a meridional tangent to said torus-like convexly curved part where it is intersected by said plane of said blade axis includes an angle of 30° to 70° with said plane so that a narrowest part of said passage is located downstream of said plane of said blade axis.

5. The propulsion apparatus defined in claim 1 wherein said inlet end is free from air-guiding shields and a meridional tangent to said torus-like convexly curved part where it is intersected by said plane of said blade axis includes an angle of 30° to 70° with said plane so that a narrowest part of said passage is located downstream of said plane of said blades.

6. The propulsion apparatus defined in claim 3 which is integrated in an aircraft nacelle, further comprising means for retracting said inlet shields axially in the direction of said torus-like convexly curved part to completely cover said passage as seen from above in a closed condition of said passage.

7. The propulsion apparatus defined in claim 2 wherein said diffuser is formed with a trailing edge at the outlet end, further comprising means for retracting said edge axially toward said plane.

8. A propulsion apparatus for generating vertical lift in an aircraft, comprising:

a fan shroud defining a substantially vertical airflow passage having an axis, an upper inlet end and a lower outlet end, said passage being rotationally symmetrical about said axis but differing from a right-circular cylinder over its entire length;

a fan rotatable in said passage about said axis and having a plurality of generally radial blades where the radial axis of these blades is lying in a plane perpendicular to said axis between said inlet and outlet ends and where these fan blades can be also rotatable around their blade axis for control purposes;

a torus-like convexly curved part rotationally symmetrical about said axis and formed on said shroud at said inlet end of said passage, said torus-like convexly curved part extending from a location substantially 1.4 $r_f$ upstream of said blades seen radially to a location substantially 0.2 $r_f$ downstream of said blades seen axially where $r_f$ is a tip radius of said blades measured from said axis to a tip of the blades, said tips of said blades defining a gap with said part which is at most 1/25 of the diameter of said fan; and at least one engine operatively connected with said fan for rotating same, said rotating blades being of airfoil cross section with the angle between the chord lines of the blades and the rotation plane of the fan blades decreasing from the hub of the fan to a radial midsection of the fan blades and increasing from the radial midsection towards the fan tip by an increment (AB) having a value in the range from 0 degrees up to 25 degrees to generate upon rotation of said fan a meridional airflow velocity through said passage which is nonuniform over the radius thereof and increases from a value proximal to said axis to a maximum at the periphery of said passage, said radial midsection of the fan blades being defined as a distance $\pm 0.25 r_f$ around a means fan blade radius and as the arithmetic means between fan hub radius and fan tip radius, and the meridional radii of curvature of said torus-like convexly curved part between said locations being $0.2 r_f$ to $1 r_f$, said axis of said radial blades lying in said plane forming the first stage of a multistage axial compressor in said passage having a number of blade planes and guide vanes spaced along said axis and the airfoil-cross-section blades of which have twists changing from stage to stage and successively approaching the twist of blades of a final stage in which the chord lines include angles with said circumferential direction of rotation which decreases continuously from the blade hub to the blade tip in contrast to the first stage blading.

9. The propulsion apparatus defined in claim 8 wherein said passage is formed with a flow-accelerating nozzle leading to said outlet end.

10. In a shrouded fan of the axial compressor type, located in a flowpath contour of convex curvature and rotational symmetry within a radius of 1.4 $r_f$ from the fan axis, $r_f$ being the fan tip radius, the convex curvature passing the fan tip in a distance of less than 1/25 of the fan diameter, the improvement wherein:

the angle (B, in FIG. 6) between the cross sectional chord and the rotation plane of the fan blades decreases from the hub of the fan to a radial midsection of the fan blades and increases from the radial midsection towards the fan tip by an increment ($\Delta$B) having a value in the range from 0 degrees up to 25 degrees to generate upon rotation of said fan a meridional airflow velocity through said flow path contour which is nonuniform over the radius thereof and increases from a value proximal to the axis of rotational symmetry of the fan to a maximum at the periphery of the flow path contour, said radial midsection of the fan blades being defined as a distance $\pm 0.25 r_f$ around a mean fan blade radius and as the arithmetic means between fan hub radius and fan tip radius.

11. The improvement defined in claim 10 wherein the flowpath curvature at the fan tip has curvature radii with values between 0.2 $r_f$ and 1.0 $r_f$ within a range on the flowpath contour from a location 1.4 $r_f$ radially upstream of the fan to a location 0.2 $r_f$ axially downstream of the fan.

12. The improvement defined in claim 10 wherein the flowpath has a contour such that the most narrow diameter of the flowpath is so far downstream of the fan, that the angle of tangent to the external flowpath contour in a place, where this contour intersects the plane of the fan blade axis, is 30° to 70° to the blade fan.

13. The improvement defined in claim 10, further comprising inlet shields covering an air inlet of the flowpath stream of the fan along the fan axix, the shields being axially retractable in a manner that they close completely the air entrance port to the fan in retracted condition.

14. The improvement defined in claim 10, further comprising a diffuser downstream of the fan, with a circular downwardly directed trailing edge forming the end of the diffuser flowpath, and wherein said annular trailing edge is axially retractable, performing a parallel motion when being retracted.

15. The improvement defined in claim 10 which comprises a multistage axial compressor with a first stage directly surrounded by a toroidal-shaped inlet flowpath with rotational symmetry within a radius of 1.4 $r_f$, where said first compressor stage has the twist of the fan blades according to claim 10, the last compressor stage has a layout of radial distribution of compressor blade twist according to which the angle of incidence ($\alpha$) continuously decreases from hub to tip, and wherein all stages between first stage and last stage provide a transition of the layout of the blade twist between the first stage to the last stage.

* * * * *